INVENTOR
DIETER SEITZER
BY John W Armbruster
ATTORNEY 3,445,828

BALANCING DRIVER DEVICE FOR MAGNETIC FILM MEMORY

Dieter Seitzer, Gattikon-Thalwil, Zurich, Switzerland, assignor to International Business Machines Corporation, New York, N.Y., a corporation of New York Filed July 28, 1964, Ser. No. 385,659
Claims priority, application Switzerland, Sept. 27, 1963, 11,942/63
Int. Cl. G11b 5/66
U.S. Cl. 340—174 15 Claims

ABSTRACT OF THE DISCLOSURE

A balancing device for write and sense amplifiers operating common lines of a thin magnetic film memory. In the device, the write amplifier and the return conductor of the drive lines of the memory are arranged in a first diagonal of a bridge circuit. The sense amplifier is connected within the second diagonal of the bridge circuit. A first branch of the bridge circuit comprises a drive line of the thin magnetic film memory in each half branch. A second branch of the bridge circuit contains impedances which, during the write-in operation, assume a different impedance value than they have during the sensing operation.

The invention concerns amplifiers for thin magnetic film memories with drive lines that are used jointly for several purposes. In particular it concerns balancing devices for write and sense amplifiers operating drive lines that serve both for write-in of binary information into the memory cells and for read-out of the stored information by sensing the voltage signals induced during the magnetization reversal of the memory cells.

A thin magnetic film memory has as memory cells small sections of a very thin film of magnetic material that can assume two distinct magnetic states to which the binary information values 0 and 1 are assigned. The production process imparts to the magnetic film a magnetic anisotropy with a preferred direction of easy magnetization, briefly called the easy direction hereinafter.

The direction orthogonal to it within the film plane is called the hard direction. The magnetic switching behavior of thin film elements is substantially a so-called single-domain behavior. The magnetization vectors of all domains of the film are jointly switched from their rest position in the easy direction into a different direction by the influence of external magnetic fields.

In memory operation these external fields originate in electric pulses or currents in the drive lines. The free switching back of the magnetization vectors into a rest position after the driving fields cease also takes place through coherent rotation of the magnetization vectors within the film plane. This rotational switching of magnetization takes place extremely rapidly, during a period of the order of nanoseconds (1 ns.$=10^{-9}$ sec.). The electric switching circuits of the memory must therefore fulfill extreme conditions of speed and reliability. Production, arrangement, and operation of a thin magnetic film memory are described in patent application U.S. Ser. No. 217,768, now Patent No. 3,257,649, filed Aug. 17, 1962.

To operate a thin magnetic film memory, drive lines, usually in the form of printed circuit strip lines, are provided, in different directions of coordinates. By means of current pulses passing through them, the drive lines extending in the easy direction serve to switch the magnetization of the coupled memory cells coherently into the hard direction. This is necessary for the sensing operation, in order that distinct voltage signals be induced in electric lines through the switching of magnetization from one of the rest positions (0 or 1) into the hard direction, which signals can be read as binary information values (0 or 1). Furthermore, a definite writing in of information is possible only immediately after the magnetization of the memory cell has been coherently switched into the hard direction; for only then is the unequivocal return of the magnetization by rotational switching into a predetermined position (0 or 1) of the easy direction possible. By means of drive lines running transversely to the easy axis, the magnetization of the memory cells can be influenced in such a way that the magnetization, when returning from the hard into the easy direction, switches into a predetermined position (0 or 1). These lines thus serve for the writing-in of information. Electric lines leading to the sense amplifiers are also required so that the voltage signals induced by the rotational magnetization switching of the memory cells can be picked up.

To allow access to a memory cell selected according an address, the word-organized arrangement of the memory matrix has proved to be suitable. Several memory cells lying in a row are combined into a word, each cell being able to store a binary information unit (bit) as a binary digit of one binary order. All binary positions of a word are written in or read-out simultaneously and in parallel. The number of write and sense amplifiers required therefore corresponds to the number of binary positions. The drive lines of the first kind, in the easy direction, are coupled with the memory cells of a word and are therefore, called word lines. They are connected to word drive amplifiers and are provided with selective switching means for addressing, so that the magnetization of all memory cells of the word selected can be switched simultaneously into the hard direction by means of a relatively strong word drive pulse. The drive lines of the second kind permit access to the memory cells of the individual binary positions (bits) of the word selected and are therefore called bit lines. For the write-in operation a bit drive pulse polarized in accordance with the information to be stored (0 or 1) is passed to each bit line at the time the word drive pulse ceases. The intensity of that pulse is smaller than that of the word drive pulse. The sense lines are generally arranged parallel to the bit lines.

The difficulties arising because of the ensuing close coupling of the lines are great; for the useful sense signals, i.e. the voltage signals induced in the sense lines during the sensing operation owing to the changes in magnetic flux in the memory cells, are smaller by two orders of magnitude than even the disturbing pulses that are induced from the bit drive lines in the parallel sense lines during the write-in operation when the write pulses propagate. The very sensitive sense amplifiers are thus overloaded during the write-in operation by the disturbing pulses that appear with a strength a hundred times that of the useful signal. The transistors are saturated with electric carriers, and the recovery time they require before the normal sensitivity of the amplifier is restored unfavorably limits the possible cycle time of the memory operations. Heretofore in the joint use of a bit drive line and sense line and of a differential transformer, a balancing device may be constructed for a joint write-sense amplifier. As an additional means for protecting the amplifier from overloading, an inhibit gate is provided that acts during the write-in operation and is controlled by a signal derived from the bit pulse.

It is an object of this invention to provide an improved balancing device for write and sense amplifiers operating common lines of a thin magnetic film memory.

It is a further object of the invention to disclose an improved balancing device with a bridge circuit, in which the power supplied for the write-in pulses is split into two equal parts of opposite polarity, which parts compensate each other at the input of the sense amplifier.

It is another object of the invention to so construct the balancing device that not only is the sense amplifier protected from disturbing pulses during the write-in operation, but that the same balancing device operates as pre-amplifier for the sense amplifier during the sensing operation.

In general the object of the invention is a balancing device for write and sense amplifiers operating common lines of a thin magnetic film memory that is characterized by the fact that the amplifier deliverying the write pulses and the return conductor of the drive lines of the thin magnetic film memory are arranged in a first diagonal of a bridge circuit; that the sense amplifier is coupled to the second diagonal of the bridge circuit; that a first branch of the bridge circuit comprises a drive line of the thin magnetic film memory in each half-branch; and that the second branch of the bridge circuit contains impedances which, during the write-in operation, assume a different impedance value than they have during the sensing operation.

These as well as further objects, features and advantages of the invention will become evident with the aid of the more detailed description of preferred embodiments which are illustrated in the attached drawings.

Figure 1:
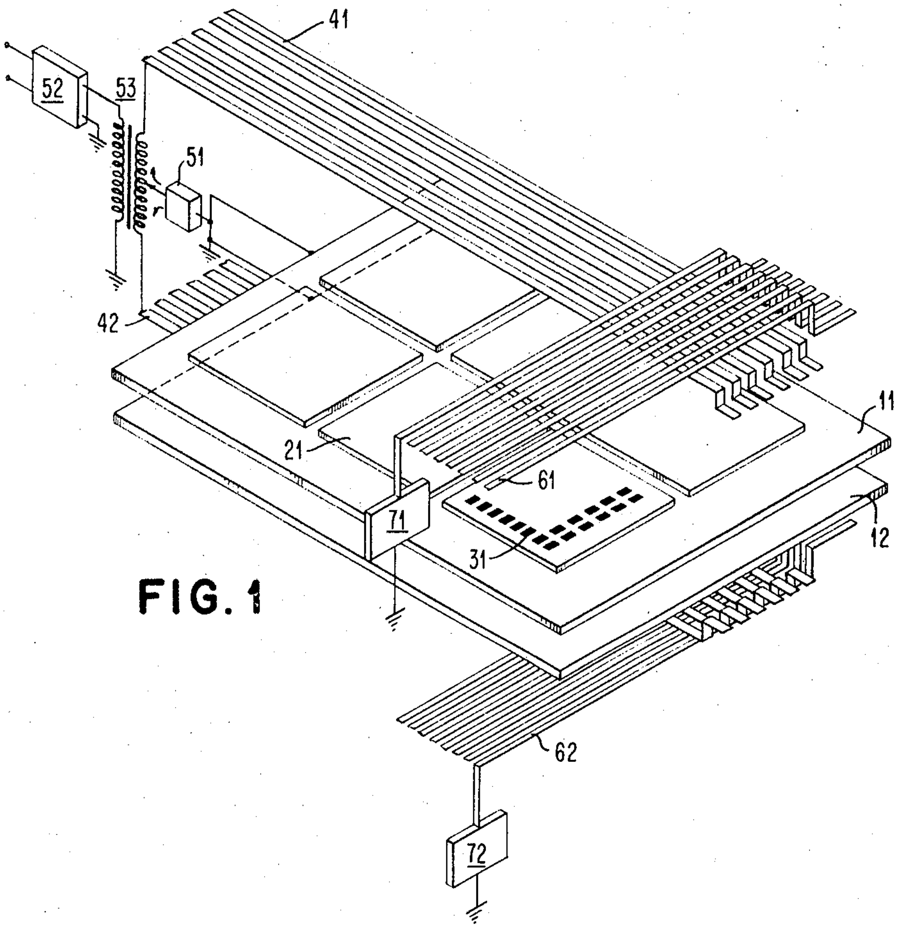
FIG. 1 shows in perspective exploded view a thin magnetic film memory with the common bit-sense lines and the word lines, and in symbolic representation the arrangement of a word drive amplifier and of a write and sense amplifier.

FIG. 1 shows, semi-schematically and in an exploded view, two memory planes, arranged back to back, of a thin magnetic film memory with a differential transformer for balancing the circuits therethrough. To facilitate balancing, the two halves are symmetrically constructed. In the upper half, a base plate 11 holds several carrier plates 21 with magnetic memory cells 31. Base plate 11 preferably consists of an electrically conducting metal, since it also serves as return conductor for the drive lines of the magnetic memory. Carrier plates 21 are, at least at their surfaces, electrically conducting. They may thus consist of a metal or alloy, like base plate 11; or they may be composed of other suitable materials, and at their surfaces facing memory cells 31 carry a metal mirror, a metallic layer deposited in a vacuum, or an electrically conducting layer otherwise mounted. The carrier plate itself may consist of an insulating material, e.g. glass, or of a material with specific magnetic properties. The size of carrier plates 21 depends on the production process of memory cells 31, whose uniaxial anisotropy of magnetization must exhibit no angular dispersion.

Magnetic memory cells 31 are of the order of one square mm. in size and between 500 and 2000 A. in thickness. Their form is preferably rectangular, the longer side being parallel to the easy direction. Other dimensions and shapes of memory cells, however, are possible. Alternatively, a continuous magnetic film may be provided in which the memory cells are defined by regions within the reach of drive line cross points. On each metallic carrier plate 21, which may e.g. consist of silver, an insulating layer (not shown) is mounted which holds memory cells 31. These consist of uniaxially anisotropic thin magnetic films and are arranged in a matrix of bit lines and word columns. They are produced from ferromagnetic material, e.g. an alloy of 80% Ni and 20% Fe, by one of the known processes; e.g. by vapor deposition, cathode sputtering, electroless deposition, or electrolytic deposition. During the production process the thin film is exposed to a magnetic field which imparts to it uniaxial anisotropy. An easy axis of the direction of remanent magnetic flux is thus defined.

U.S. Patents 3,047,423, 3,071,756, 3,093,818, 3,098,803, and 3,130,390 are illustrative of thin film processes and memory array devices. The matrix arrangement of memory cells 31 in rows and columns can be produced by various means, for example vapor deposition in a vacuum through a mask, the particles being deposited only at certain spots and in a particular arrangement through the openings in the mask. In another method the magnetic alloy can be deposited in a completely continuous film according to one of the above production processes, the parts of the film that are not required, i.e. the spaces between the memory cells, subsequently being removed, e.g. by a photo-etching process.

Carrier plate 21 is produced from an electrically conducting material such as silver, and its surface carrying the insulating layer is well polished. The insulating layer may e.g. consist of a thin film of vapor-deposited silicon oxide (SiO) which not only insulates memory cells 31 from carrier plate 21 but also levels any remaining surface roughness. Adhesion properties are also improved by such intermediate layers.

A number of bit lines 41 extending in the direction of the rows are provided, each of them coupled with all memory cells 31 in a corresponding row of the memory matrix. The bit lines extend transversely to the direction of the easy axis of the memory cells. Each bit line 41 is conductively connected to the grounded base plate 11 with its one end—on the right in the diagram—while the other end leads to write amplifier 51, as well as to the associated sense amplifier 52, via the balancing device, here differential transformer 53. For the sake of clarity this is illustrated for only one bit line 41, or for a pair of bit lines 41 and 42. Further peripheral switching circuits for addressing, i.e. the selection of and access to the individual memory cells, are also not shown.

The balancing device for each pair of bit lines 41, 42 has as a result that each bit line can be used for both write-in and sensing of information. During write-in the bit lines are connected through to the bit drive amplifiers, write amplifiers 51. For read-out, the bit drive amplifiers are disconnected and sense amplifiers 52 connected to the appropriate bit line 41, 42. The bit lines too are electrically insulated from memory cells 31 by a thin layer (not shown), e.g. of silicon oxide. They may have been produced by a vapor-deposition process, and are preferably strip lines. They can also be slotted so that each drive line consists of several narrow strip lines connected in parallel.

In the memory matrix of the upper half of the magnetic memory, a number of word lines 61 is provided in the direction of the columns. These word lines too are preferably strip lines produced by one of the known processes. For example, like the intervening insulating layer they may be produced by vapor deposition in a vacuum using a mask. It is also possible to etch the pattern of the lines out of a continuous metallic layer, which may be mounted on the upper or side surface of a thin insulation foil. Word lines 61 extend in the easy direction of memory cells 31, orthogonally to bit lines 41. Each word line 61 is coupled with the memory cells 31 of a word arranged in a column of the memory matrix. One end of each word line 61—the far end in the illustration—is conductively connected to the grounded base plate 11, while the other end leads to a word drive amplifier 71. Here too, only one such amplifier is shown, and further address and selection means are omitted for the sake of clarity.

The balancing device serves to connect the bit lines with the means for bit selection and with the bit drive amplifiers during that part of the memory cycle serving for information write-in; and to the appropriate sense amplifiers during that part of the memory cycle serving for read-out. In this manner the bit lines have the dual function of acting as bit drive lines during the write-in operation and as sense lines during the read-out operation. For greater effectiveness of the balancing device, it is best if the memory planes are equipped in duplicate, i.e. if two symmetric arrangements are combined; such that one balancing device is associated with a first memory plane having base plate 11, carrier plates 21 and memory cells 31, bit lines 41, word lines 61, and word drive amplifiers 71; as well as the same balancing device is associated with a second memory plane having base plate 21, carrier plates 22 and memory cells 31, bit lines 42, word lines 62, and word drive amplifiers 72.

A current pulse sent through a word line 61, 62 switches the magnetization of the associated memory cells 31, 32 into the hard direction by means of its magnetic field. To perform this function efficiently, word lines 61, 62 should lie as precisely as possible in the easy direction of memory cells 31, 32. One is free to choose the direction of bit lines 41, 42, but their arrangment orthogonal to the word lines has proved to be suitable. Since bit lines 41, 42 are also used as sense lines during the sensing operation, the most effective decoupling between the two lines systems is achieved with this orthogonal arrangement. The task of word lines 61, 62 is to switch the magnetization of memory cells 31, 32 of the word selected into the hard direction, while that of bit lines 41, 42 is to deliver the field components acting in the easy direction so that the magnetization can return into a predetermined rest position. The polarity of the bit drive pulses therefore depends on the information to be stored. The driving fields supplied by the bit drive pulses are considerably weaker than the word drive fields. They can thus act on the magnetization of only those memory cells that had previously been switched into the hard direction by a word drive field. The information contained in the memory cells of all words not selected remains unaffected.

The operation cycle usually employed in a word-organized memory arrangement is thus the following. For write-in of a selected word, the magnetization of all the memory cells concerned is simultaneously switched into the hard direction by means of a driving pulse in the word line of that word. Almost simultaneously but a little later, the bit lines carry write-in pulses, polarized in accordance with the binary information to be stored, whose field delivers, after the word drive pulse has faded, the driving-back torques for the unequivocal rotational switching of the magnetization of the memory cells involved into the predetermined rest position (0 or 1). To read out information stored in the memory cells of the binary positions of a word, a driving pulse in the word line is required that switches the magnetization of all the memory cells of that word simultaneously into the hard direction. A signal depending on the rest position previously assumed (0 or 1) then occurs in each sense line associated with a binary position that may be interpreted as a binary 0 or 1. The two memory planes of a balancing device are preferably symmetrically constructed and lie back to back. It is possible, however, to place both halves into one plane and the balancing device between them.

The balancing device operates as follows. The power raised for the write-in pulses is split into two parts of opposite polarity which compensate each other at the sense amplifier input. So that the same binary information is not simultaneously written into both halves, a word in only one half is selected via a word line 61 or 62. Memory cells whose magnetization is in the rest position, that is containing stored binary values, are not affected by a write pulse. The information is now written into those memory cells whose magnetization was switched into the hard direction by means of a word drive pulse immediately before. Similarly to read out the stored binary information of a word selected in one memory half or one memory plane, only one word line 61 or 62 is activated. The sense signal thus induced runs in only one half also of the balancing device and is thus active at the input of the sense amplifier.

Figure 2:
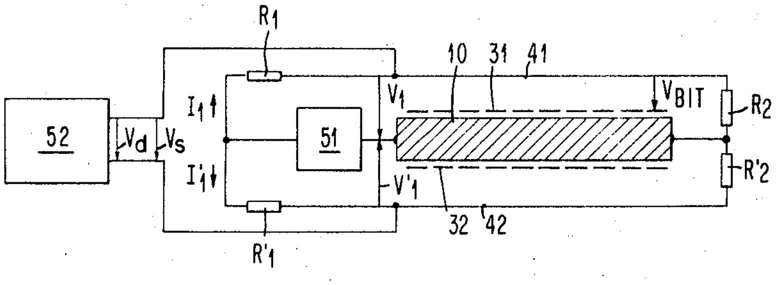
FIG. 2 shows a schematic circuit diagram of a bridge arrangement to illustrate the inventive principle.

To illustrate the mode of operation, FIG. 2 shows a schematic circuit diagram of a bridge circuit suitable as a balancing device. As is the case in the other figures showing balancing devices according to the invention, only one pair of bit lines 41, 42 is shown with the associated write amplifier 51 and sense amplifier 52. Clearly a number of these devices must exist in a thin magnetic film memory. The usual word lines with the associated word drive amplifiers and switching means are also omitted from the drawings. The bridge circuit generally consists of four impedances $R_1$, $R_1'$, $R_2$, $R_2'$. A first diagonal contains the amplifier 51 delivering the write pulses, and the return conductor of the drive lines of the thin magnetic film memory, formed of base plate 10 carrying memory cells 31, 32. Sense amplifier 52 is connected to the second diagonal of the bridge circuit.

If the bridge circuit is in its balanced state the impedances in the half-branches are so matched that the second diagonal, i.e. sense amplifier 52, receives no signal from the write pulses fed into the first diagonal during write-in. The write-in current splits into the two oppositely directed equal parts $I_1$ in the upper branch $R_1$, $R_2$, and $I_1'$ in the lower branch $R_1'$, $R_2'$. Oppositely polarized voltages $V_1$ and $V_1'$ thus occur in the two branches. The minimal differential voltage $V_d=V_1-V_1'$ that may still be present at the input of sense amplifier 52 if the impedances have not been precisely adjusted is a disturbing voltage for the highly sensitive sense amplifier that should be avoided if possible.

In the read-out operation of the magnetic memory, a memory cell 31 is read-out by means of a selected word line, e.g. in the upper half. The word lines that are not shown would run perpendicularly to the plane of the paper in FIG. 2. A voltage signal of only one binary position, e.g. voltage $V_{bit}$ of the memory cell 31 at the extreme right is thus induced into bit line 41. This voltage should if possible be available in full strength as signal voltage $V_s$ at the input of sense amplifier 52. An oppositely polarized voltage in the lower branch, which could compensate the signal voltage, does not occur, since by definition a word line in only one half of a memory plane is activated for sensing binary information.

According to the invention the impedances used in the balancing device assume during write-in an impedance value different from that which they have during sensing. During write-in the impedances $R_1$ and $R_1'$ should be as small as possible. Since they lie in the path of bit lines 41, 42, a low impedance means little loss in driving current; or, the magnetic memory may be operated for write-in with relatively low pulse power. Also, in the case of possible imbalance of currents $I_1$ and $I_1'$, the smaller the impedance values $R_1$ and $R_1'$ the smaller will be the differential voltage $V_d$ appearing at the input of sense amplifier 52. During sensing a signal voltage $V_{bit}$ is induced into bit line 41. $V_{bit}$ is a very small voltage signal, and for that reason the signal voltage $V_s$ still present at the input of sense amplifier 52 should if possible be equal to the voltage $V_{bit}$. This condition, however, requires high impedance values of $R_1$ and $R_1'$.

Figure 3:
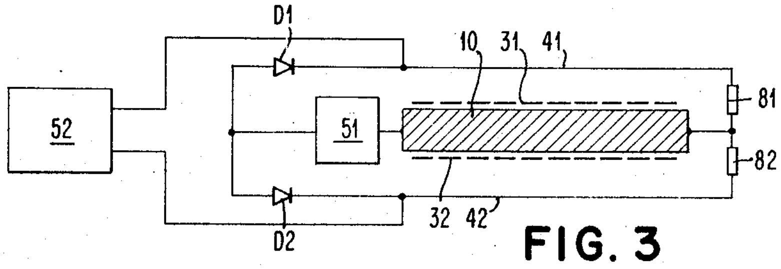
FIG. 3 shows a schematic circuit diagram of a balancing device with galvanically coupled sense amplifier and with direction-dependent non-linear resistors in a branch of the bridge circuit.

In FIG. 3, impedances $R_1$ and $R_1'$ are therefore replaced by current-direction-dependent nonlinear resistances, i.e. diodes $D_1$ and $D_2$. These diodes are so polarized that they present a low impedance value to the write pulses during the write-in operation and a high impedance value to the sense signals during sensing. Diodes $D_1$ and $D_2$ offer their low forward resistance to the write current, thus reducing the required write current and giving rise to only minimal disturbing voltages at the input of the sense amplifier. For the very small sense signal, the diodes are operated in their backward direction. In this way a very favorable ratio of the voltages $V_s$:$V_d$ is obtained, and the write pulse power needed is also low. Impedances $R_2$, $R_2'$ are formed by bit lines 41 and 42 with their terminal resistances 81, 82. The terminal resistances are preferably of approximately the characteristic impedance of the drive lines. If necessary, they may be replaced by a direct connection of bit lines 41, 42 to base plate 10. The finite relaxation time of passive semiconductor elements such as diodes can be a disadvantage, particularly in magnetic memories with very short cycle times. These delaying loading effects can be avoided by using active semiconductor elements such as transistors, if they are operated in an unsaturated condition.

Figure 4:
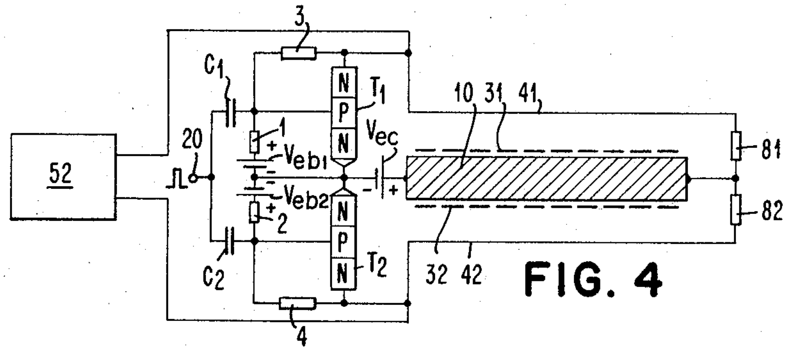
FIG. 4 shows a schematic circuit diagram of a balancing device with galvanically coupled sense amplifier and with a transistor circuit in a branch of the bridge.

FIG. 4 shows an embodiment in which a very favorable ratio of the voltages $V_s$:$V_d$ with a negligible relaxation time can be achieved. The last stage of the write amplifier is combined with the balancing device in the fashion illustrated. Transistors $T_1$ and $T_2$ are of NPN conductivity type. Their emitters are connected to the negative poles of the three voltage sources. The collector of $T_1$ is connected to bit line 41, that of $T_2$ to bit line 42. The emitter-collector voltage source $V_{ec}$ lies against base plate 10 with its positive poles. In each part of the symmetric circuit an emitter-base voltage source, $V_{eb1}$, $V_{eb2}$ is provided whose negative pole is connected to the emitter reference point. The positive pole of $V_{eb1}$ is carried to the base of transistor $T_1$ via a resistor 1, and that of $V_{eb2}$ to the base of transistor $T_2$ via resistor 2. The write pulses coming from input terminal 20 are applied to the control electrodes, i.e. the base leads of transistors $T_1$ and $T_2$, via capacitors $C_1$ and $C_2$. If the transistors are operated in their active region, their collector resistance is always high compared to the remaining impedances of the circuit, as it should be for favorable transmission of the voltage signals. Small fabrication tolerances of the transistors can be compensated by negative feedback resistors 3, 4 between collector and base and by a suitably different choice of emitter-base bias voltage. The use of transistors as changeable impedances also makes possible the use of bipolar write pulses if that should be required for operating the magnetic memory.

Figure 5:
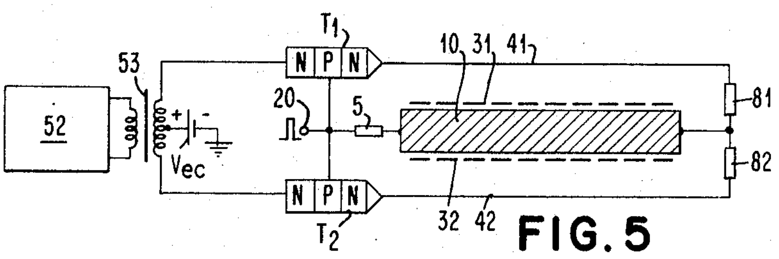
FIG. 5 shows a schematic circuit diagram of a balancing device with a sense amplifier inductively coupled via a differential transformer and with transistors as impedances in a branch of the bridge circuit, the transistors also acting as pre-amplifiers for the sense amplifier during the sensing operation.

FIG. 5 shows an embodiment in which during sensing transistors $T_1$, $T_2$ serve in addition as pre-amplifiers for sense amplifier 52 coupled via differential transformer 53. Transistors $T_1$ and $T_2$ are of the NPN type of conductivity. Each of their emitters is connected to a bit line 41, 42 terminated with resistors 81, 82. The collectors are passed to the ends of the primary of differential transformer 53, between whose center tap and earth lies the voltage source $V_{ec}$ with its negative pole grounded. A resistor 5, across which the control voltage can be developed, is inserted between the base leads of the transistors and grounded base plate 10. If during write-in a write pulse is applied to the base electrodes of transistors $T_1$, $T_2$ via input terminal 20, both operate as emitter follower and feed a write current into the associated bit line 41 or 42. The sense amplifier 52 connected to the secondary of differential transformer 53 receives no disturbing voltage signal, since the write currents compensate one another in the differential transformer. If during sensing a sense signal is induced in one of the bit lines, e.g. 41, then the associated transistor $T_1$ operates as an amplifier stage in base configuration. Since its base electrode is not grounded, however, the base of the other transistor $T_2$ also receives a small input signal. Transistor $T_2$ therefore supplies a signal of reversed polarity to the lower end of the primary of differential transformer 53. The transformer is thus operated somewhat in a push-pull mode and sense amplifier 52 receives an already pre-amplified signal.

Figure 6:
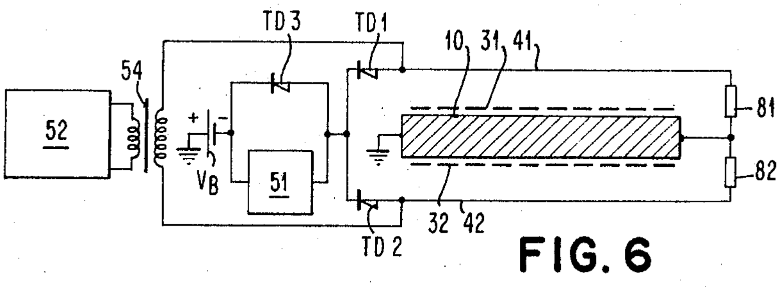
FIG. 6 shows a schematic circuit diagram of a balancing device with a sense amplifier inductively coupled via a transformer and with tunnel diodes as impedances in a branch of the bridge circuit, a further tunnel diode shunted to the write amplifier as clipper for the write pulses.
Figure 7:
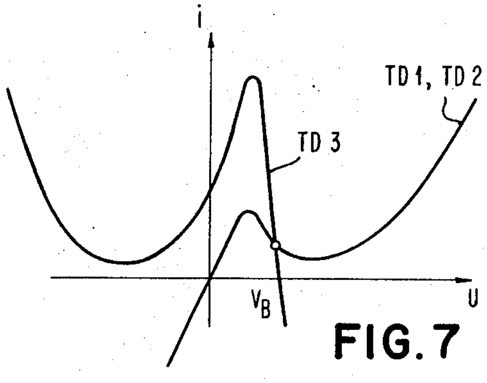
FIG. 7 shows the I–V plots of the tunnel diodes used in the arrangement of FIG. 6, and the battery bias voltage required for adjusting the operating point.

FIG. 6 shows an embodiment in which the impedances changing their values are tunnel diodes in a branch of the bridge circuit. FIG. 7 shows the associated I–V-plots for adjusting the operation point. Tunnel diodes $TD_1$ and $TD_2$ replace impedances $R_1$ and $R_1'$. A third tunnel diode $TD_3$ is connected in parallel to write amplifier 51. It serves as bias resistor for tunnel diodes $TD_1$ and $TD_2$, since between it, with the shunted write amplifier 51, and base plate 10 lies the bias voltage source $V_B$ whose positive pole is grounded. Sense amplifier 52 is inductively coupled to the bridge circuit via a transformer 54. Tunnel diodes $TD_1$ and $TD_2$ are so biased by voltage source $V_B$ via the small forward resistance of the third tunnel diode $TD_3$ that the operation point is in the region of negative dynamic resistance, i.e. in the descending part of the characteristic curve (cf. FIG. 7). The (coinciding) characteristics of tunnel diodes $TD_1$, $TD_2$ are shown in the I–V-plot. The characteristics of tunnel diode $TD_3$, drawn to the left, which shows the voltage values of the differential voltage: battery voltage $V_B$ minus voltage drop across $TD_3$, replaces a straight line characteristic, inclined to the left, of an ohmic bias resistor. The tunnel diodes are so chosen that the knee of the current peak in the curve of $TD_3$ has a little more than twice the current values of the corresponding points of the characteristics for $TD_1$, $TD_2$. In this way a stable intersection of the two, or three, characteristics that defines the operation point is achieved.

In sensing the tunnel diode $TD_1$ or $TD_2$ associated with the activated half of the memory plane serves as linear amplifier in the region of the descending characteristic and a correspondingly amplified voltage signal is supplied to sense amplifier 52 via transformer 54. If during write-in a positive write pulse is fed to bit lines 41, 42 via write amplifier 51, tunnel diodes $TD_1$, $TD_2$ are driven into a region of their characteristics in which they exhibit a very small impedance value. In this way the input of the sense amplifier is practically short-circuited and the transformer not magnetized, so that no disturbing voltages are passed to sense amplifier 52. At the same time tunnel diode $TD_3$ is driven by the write pulse to a valley point of its characteristic, where it has a very high impedance value. During write-in very little write current is thus lost in the shunt of write amplifier 51. Tunnel diode $TD_3$ has a certain clipping effect on the write current, which can be advantageous for operating magnetic memories. Tunnel diode switches are particularly suitable for magnetic memories operated at very high speed. It is not suitable to adjust a stable operation point for linear amplification of the sense signal by means of an ohmic bias resistor instead of tunnel diode $TD_3$; for, owing to the steepness of the resistor characteristic curve necessary to produce an unequivocal intersection with the descending part of the tunnel diode characteristics, a very low-ohmic resistor would then have to be used. (During the sensing operation, the parallel path through write amplifier 51 is blocked.) Such a low resistance, however, would make an economic write-in operation impossible, since the largest part of the write pulse power would be lost in the shunt of write amplifier 51. Only the use of tunnel diode $TD_3$ makes possible both operations, sensing and write-in, with the same balancing device.

Figure 8:
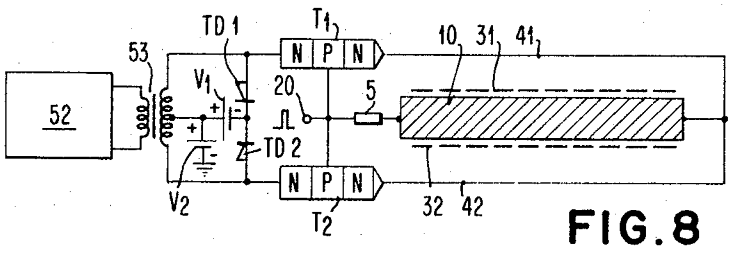
FIG. 8 shows a schematic circuit diagram of a balancing device with a sense amplifier inductively coupled via a differential transformer and with tunnel diodes as impedances in a branch of the bridge circuit, as well as transistors which also act as pre-amplifiers for the sense amplifier during the sensing operation.

FIG. 8 shows an embodiment particularly suitable for high-speed magnetic memories. As in the embodiment shown in FIG. 5, transistors $T_1$, $T_2$, arranged in the same configuration, are provided, which operate as emitter follower during write-in and as fast amplifier in base configuration, or as push-pull amplifier in the other half of the memory plane, during sensing. In addition the two half windings of the primary of the differential transformer 53 are bridged with tunnel diodes $TD_1$, $TD_2$, which during write-in shorten the input of the sense amplifier. The voltage source $V_1$ of ca. 100 mv. serves to adjust the operation points for tunnel diodes $TD_1$, $TD_2$. $V_2$ is the emitter-collector voltage source with several volts for transistors $T_1$, $T_2$. The emitter base voltage drops across resistor 5. If during write-in a positive write pulse is supplied to input 20 by the write amplifier, both tunnel diodes $TD_1$, $TD_2$ are driven into a region of their characteristics in which they represent a very low impedance value. In this way the circuit according to FIG. 5 is considerably improved, since the tunnel diodes now practically shorten the possibly imperfect differential transformer 53 during write-in, such that sense amplifier 52 can receive still fewer disturbing voltages. Since with the choice of the bias voltages the tunnel diodes $TD_1$, $TD_2$ have their operation point in the descending part of the characteristics, they operate as linear amplifiers with negative impedance in a push-pull mode during sensing, and in their action support the also amplifying transistors $T_1$, $T_2$.

Figure 9:
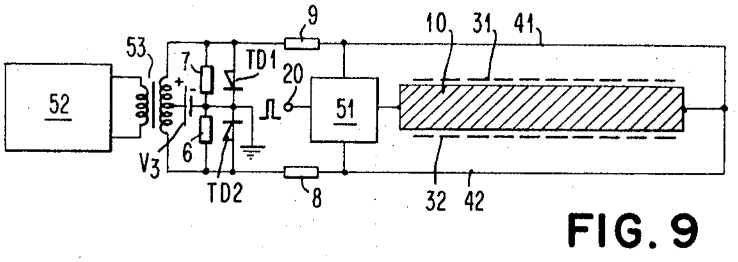
FIG. 9 shows a schematic circuit diagram of a balancing device with a sense amplifier inductively coupled via a differential transformer and tunnel diodes as impedances in a branch of the bridge circuit, which also act as pre-amplifiers for the sense amplifier during the sensing operation.

FIG. 9 shows a very fast-operating balancing device according to the invention equipped with tunnel diodes, which during write-in acts as voltage limiter for the input of the sense amplifier, and in addition gives good preamplification during sensing. This circuit is also suitable for bipolar bit pulses. A write amplifier 51 is connected to bit lines 41, 42 of the magnetic memory. Bit line 41, via resistor 9, leads to the upper end of the primary of differential transformer 53, and bit line 42, via resistor 8, to the lower end. Voltage source $V_3$ is between the center tap and ground. From its negative pole, the tunnel diode $TD_1$ shunted with resistor 7 is connected to the upper line leading to the transformer winding; accordingly, tunnel diode $TD_2$ and resistors 6 are connected to the lower line. If, for example, one uses a resistance 9 that is large compared to the impedance of tunnel diode $TD_1$, a voltage limitation for disturbing signals passing to differential transformer 53 could be achieved during write-in. In this case the tunnel diode could not without further ado amplify the sense signals during the sensing operation; however, amplification can nonetheless be achieved by inserting parallel resistor 7 shunting tunnel diode $TD_1$ if the conditions described below are met.

Figure 10:
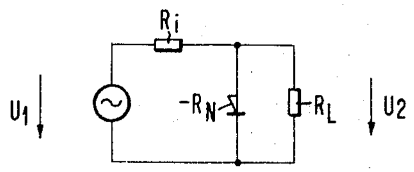
FIG. 10 shows a circuit diagram illustrating the mode of operation of a tunnel diode amplifier.

FIG. 10 shows an equivalent circuit, the dynamic negative impedance of the tunnel diode in its operation region for small signal amplification being designed as $-R_N$. The voltage to be amplified is $U_1$, e.g. a sense signal. The resistance in the feed line is $R_i$. Voltage $U_2$ appears at load resistor $R_L$, which is connected in parallel to the tunnel diode. The amplification of this circuit is:

$$V=\frac{U_2}{U_1}=\frac{1}{1+\frac{R_i}{R_L}-\frac{R_i}{R_N}}$$

It can be shown that for stable amplification without oscillation tendency the condition must be met:

$$1+\frac{R_i}{R_L}>\frac{R_i}{R_N}>\frac{R_i}{R_L}$$

Thus amplification for small signals can be achieved with the inserted resistor $R_L$, although a condition for voltage limitation is that $R_i$ must be greater than the tunnel diode impedance $R_N$. In practice other values enter into the impedance values of the equivalent circuit, a fact that must be considered when designing the resistors practically used in the circuit according to FIG. 9. For example, the series connection of resistor 9 with the impedance of bit line 41 enters into resistance $R_i$. The parallel connection of resistor 7 with the transformed input impedance of the sense amplifier acts as effective load resistance $R_L$. The inserted parallel resistor 7 contributes to the dynamic stability of the amplifier circuit. It is best to use a resistor of induction-free construction.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a magnetic memory device comprising plural arrays of memory elements and common writing and sensing drive lines therefor, (a) write and sense amplifiers for each of said lines, (b) a pair of impedance elements for each of said lines which assume a first and lesser impedance value to current therethrough in one direction and a second and greater impedance value to current therethrough in a direction opposite to said one direction, (c) and a balancing bridge circuit wherein said common drive line comprises two adjacent branches, and said impedances are in the other two adjacent bridge branches, (d) one diagonal of said bridge circuit contains said write amplifier and bisects said impedance branches, said impedances being arranged in said one diagonal to assume said first impedance value.

(e) and a second diagonal line of said bridge circuit is coupled to said sense amplifier and parallel to both impedance branches, said impedances being arranged in said second diagonal to assume said second impedance value, (f) whereby said impedances assume during a writing operation, an impedance value lower that that which they have during a sensing operation.

2. A memory device according to claim 1 wherein said sense amplifier is electrically connected in series in said second diagonal line of said bridge circuit.

3. A memory device according to claim 1 wherein said sense amplifier is inductively coupled to said second diagonal line of said bridge circuit.

4. A memory device according to claim 3 wherein said inductively coupled sense amplifier is coupled to said second diagonal line by means of a differential transformer.

5. A memory device according to claim 1 wherein said impedance elements are current-directive-dependent nonlinear resistors.

6. A memory device according to claim 5 wherein said nonlinear resistors are diodes so polarized that they offer low impedance to the write pulses during a write-in operation and they present high impedance to the sense signals during a sensing operation.

7. A memory device according to claim 1 wherein said impedance elements in said other adjacent bridge branches of said bridge circuit are semiconductors such as tunnel diodes.

8. A memory device according to claim 7 wherein said impedance elements in said branches of the bridge circuit are controllable semiconductor components such as transistors.

9. A memory device according to claim 7 wherein to perform as said impedance elements both tunnel diodes and transistors are provided in said other adjacent bridge branches.

10. A memory device according to claim 8 wherein said bridge branches contain said semiconductors in such a way that additional pre-amplification of the sense signal is achieved during the sensing operation of the magnetic memory elements.

11. A memory device according to claim 10 wherein both ends of each of said lines are connected (a) to the emitters of NPN type transistors, the outer ends of the primary of a differential transformer coupling said sense amplifier to the bridge circuit are connected to (b) the collectors, the voltage source is between a center (c) tap and ground, and the interconnected bases are connected with the source of the invite pulses and, also connected through a resistor, with said one diagonal as the return conductor of said lines.

12. A memory device according to claim 11 wherein a pair of tunnel diodes are connected with one terminal of each of the pair leading to the collectors of said transistors, and the other terminals of the pair of diodes are interconnected and lead via a voltage source to the center tap of the primary of said differential transformer.

13. A memory device according to claim 10 wherein (a) said lines are connected to separate terminals of said tunnel diodes, (b) with the other interconnected terminals of said diodes connected to the output of said write amplifier and, via a third tunnel diode as a bias resistor, to the voltage source, (c) and with said sense amplifier coupled to said lines by a transformer.

14. A memory device according to claim 10 wherein (a) each of said lines in connected to said write amplifier and also via a series resistor to one end of the primary of a differential transformer coupling said sense amplifier to said bridge circuit.

(b) with a voltage source being connected to the center tap by its positive pole, its negative pole being grounded, (c) and with a parallel connection consisting of a tunnel diode and a parallel resistor being connected between each outer end of said primary and said negative pole.

15. A memory device according to claim 14 wherein the values of the resistors and the characteristic values of said tunnel diode are so proportioned that the effective resistances (series resistor $R_i$ diode resistance $R_N$, and parallel resistor $R_L$) of the equivalent circuit for small signal amplification of a tunnel diode amplifier fulfill the condition necessary for stability and amplification properties; namely:

$$1+\frac{R_i}{R_L}>\frac{R_i}{R_N}>\frac{R_i}{R_L}$$

References Cited

UNITED STATES PATENTS

| | | | |
|---|---|---|---|
| 3,137,843 | 6/1964 | Gaunt | 340—174 |
| 3,303,481 | 2/1967 | Kessler | 340—174 |
| 3,066,281 | 11/1962 | Mertz et al. | 340—174 |
| 3,209,337 | 9/1965 | Crawford | 340—174 |
| 3,257,649 | 6/1966 | Dietrich et al. | 340—174 |

BERNARD KONICK, *Primary Examiner.*

BARRY L. HALEY, *Assistant Examiner.*